United States Patent [19]

Westermann

[11] 4,098,739
[45] Jul. 4, 1978

[54] BLENDS CONTAINING MODIFIED POLYETHYLENE

[75] Inventor: Peter Henry Westermann, Dorking, England

[73] Assignee: The British Petroleum Company Limited, London, England

[21] Appl. No.: 779,496

[22] Filed: Mar. 21, 1977

[30] Foreign Application Priority Data

Mar. 26, 1976 [GB] United Kingdom ............... 12226/76

[51] Int. Cl.² ............................................. C08L 91/00
[52] U.S. Cl. ........................ 260/28.5 D; 260/33.6 UA
[58] Field of Search .................. 260/28.5 D, 33.6 UA

[56] References Cited

FOREIGN PATENT DOCUMENTS 1,250,756  10/1971  United Kingdom.
1,271,233   4/1972  United Kingdom.
1,400,636   7/1975  United Kingdom.
1,400,821   7/1975  United Kingdom.

OTHER PUBLICATIONS

Abraham–Asphalt & Allied Substances (6th ed.) (vol. 2) (Van Nostrand) (N.Y.) (1961), p. 177; (vol. 4) (1962), pp. 364–365.

*Primary Examiner*—Lewis T. Jacobs
*Attorney, Agent, or Firm*—Brooks, Haidt, Haffner & Delahunty

[57] ABSTRACT

A blend of chlorosulphonated polyethylene elastomer and hardened extract obtained by blowing a gas containing free oxygen at elevated temperatures into a solvent extract of petroleum vacuum distillate or a deasphalted petroleum residue which extract boils above 350° C at atmospheric pressure and contains a major proportion of aromatic hydrocarbons, said hardened extract having a saturated hydrocarbon content of not more than 10% by weight. The hardened extract serves not only to extend the chlorosulfonated polyethylene, but also improves certain physical properties of sheets made from the blend.

18 Claims, No Drawings

BLENDS CONTAINING MODIFIED POLYETHYLENE

The present invention relates to blends containing chlorosulphonated polyethylene.

Chlorosulphonated polyethylene elastomers are known for use as waterproof membranes e.g. for tank linings as shown by "Encyclopedia of Chemical Technology" edited by Kirk-Othmer 2nd edition, Volume 7 Page 695. Chlorosulphonated polyethylene elastomers have a number of disadvantages however. Thus for many purposes they have too low a modulus and tear strength.

It would be desirable to find a method of improving the physical properties of chlorosulphonated polyethylene elastomers and also a way of making a cheaper product based on chlorosulphonated polyethylene elastomers.

However when attempts are made to add bitumen to chlorosulphonated polyethylene to give a cheaper product, the resulting material has an exceedingly low tensile strength and modulus.

It has now surprisingly been found that useful compositions can be obtained by using, instead of bitumen, a product known as hardened extract or aromatic extract resin.

According to the present invention there is provided a blend of a chlorosulphonated polyethylene elastomer and hardened extract (as hereinafter defined), said hardened extract having a saturated hydrocarbon content of not more than 10% by weight.

According to a further aspect of the present invention there is provided a blend of a chlorosulphonated polyethylene elastomer, chlorinated polyethylene and hardened extract (as hereinafter defined), said hardened extract having a saturated hydrocarbon content of not more than 10% by weight.

According to another aspect of the present invention there is provided a blend of chlorosulphonated polyethylene elastomer, hardened extract, said hardened extract having a saturated hydrocarbon content of not more than 10% by weight, and a vulcanisation agent.

According to yet another aspect of the present invention there is provided a vulcanised article comprising chlorosulphonated polyethylene elastomer and hardened extract having a saturated hydrocarbon content of not more than 10% by weight.

The Chlorosulphonated Polyethylene Elastomer

The chlorosulphonated polyethylene elastomers used in the present invention are made by treating polyethylene with chlorine and sulphur dioxide to give a product containing — Cl and — $SO_2Cl$ groups. Chlorosulphonated polyethylenes elastomers are commercially available under the trade name 'Hypalon' by E. I. du Pont de Nemours & Company Inc. Information on these polymers is given in Volume 7 Page 695 of Kirk-Othmer referred to above.

The Hardened Extract

Throughout this specification 'hardened extract' means a material obtained by blowing a gas containing free oxygen into a petroleum extract at elevated temperatures, the petroleum extract having been obtained by the solvent extraction of a product of petroleum refining which is a distillate petroleum fraction or a de-asphalted petroleum residue, which product boils above 350° C at atmospheric pressure and which contains a major proportion of aromatic hydrocarbons.

The product of petroleum refining subjected to solvent extraction may be for example a vacuum distillate obtained by vacuum distillation of a residue from an atmospheric pressure distillation. Alternatively the product of petroleum refining may be obtained from vacuum residue (the residue of the vacuum distillation referred to above) after asphaltenes have been removed by precipitation with liquid propane. The solvent extraction to give a product containing a major proportion of aromatic hydrocarbons may be carried out on mixtures of distillates and residues.

The product of petroleum refining from which the petroleum extract is obtained is preferably a vacuum distillate boiling in the lubricating oil range e.g. at a temperature in the range 350° to 600° C. Such vacuum distillates are well known to those skilled in the art.

The elevated temperature at which the gas containing free oxygen e.g. air is blown into the petroleum extract may for example be 250° to 350° C.

Examples of solvents which may be used to extract the distillate petroleum fraction are furfural, phenol and N-methyl pyrrolidone. The product subjected to extraction is substantially free from asphaltenes, and this extraction process must be distinguished from the use of, for example, liquid propane to obtain a product rich in asphaltenes from residues, which is sometimes described as a 'solvent' process.

Examples of such petroleum extracts are materials sold under the designation 'Enerflex' Process Oils by BP Oil Ltd., London. Particular examples of petroleum extracts suitable for air blowing are Enerflex 65 and Enerflex 96 particularly Enerflex 96. It is preferred that the hardened extract is prepared from a petroleum extract having a content of 'saturates' and 'aromatics' as determined by molecular-type analysis (clay-gel) ASTM D2007, of less than 15% by weight more preferably less than 10% by weight for saturates and preferably greater than 75% by weight, more preferably greater than 80% by weight for aromatics.

The 'hardened extract' resulting from the air blowing referred to above is a solid material at room temperature. In order to obtain a hardened extract having the desired low content of saturated hydrocarbon it may be necessary to select a petroleum extract in which the saturated hydrocarbon content is low. The choice of a suitable petroleum extract can readily be made by the man skilled in the art on the basis of simple tests. The blowing with air may be carried out in the presence of a catalyst e.g. a metal halide Friedel-Crafts catalyst such as ferric chloride, or without a catalyst.

The hardened extracts used in the present invention are to be distinguished from bitumens by the fact that they are made by a process which involves the production of a product which is substantially free of asphaltenes by either distillation or by de-asphalting a residue, followed by a solvent extraction, the asphaltenes only being introduced by the blowing with gas containing free oxygen. When crude oil is distilled to remove materials boiling up to the end of the gas oil range, the resulting residue, known as atmospheric residue, can be subjected to vacuum distillation to recover waxy distillates. The residue from this vacuum distillation is known as vacuum residue. The bitumen may be obtained directly from this residue or the residue may be air blown to produce a low penetration bitumen. Alternatively residue (either atmospheric or vacuum) may be treated with for example liquid propane to precipitate a bitmen layer. In all these cases the asphaltenes in the bitumen comes directly from the residue, and there is no intermediate formation of an intermediate material substantially free of asphaltenes.

The composition of hardened extracts and bitumens may be determined on the basis of their content of certain classes of material, namely 'asphaltenes', 'toluene insolubles', 'saturates', 'cyclics' and 'resins'. In this method asphaltenes are defined as that fraction which is precipitated by a large excess of n-heptane but which is soluble in toluene. Toluene insolubles are that fraction which is insoluble in toluene. Saturates are defined as that fraction which is eluted by n-heptane from an alumina/silica gel column, cyclics as that fraction which is eluted by toluene, and resins as that fraction which is eluted by a 50/50 toluene/absolute ethanol mixture.

Typical data on hardened extracts and bitumens are given in Table 1 where "HE" means 'hardened extract' and the number following "HE" is the softening point.

It will be seen that the hardened extracts have much lower saturated hydrocarbon contents and higher asphaltenes and toluene insolubles contents than either straight run or blown bitumens of equivalent softening point. Preferably the hardened extracts used have asphaltene plus toluene insolubles contents of at least 20% by weight and saturated contents of less than 5% by weight. Preferably the content of asphaltenes alone is at least 20% by weight.

Hardened extracts are available having a range of softening points. Thus hardened extracts having softening points ranging from 50° to 200° C may be used. It is preferred to use hardened extracts having a softening point in the range 85°-170° C. The softening point of hardened extract is measured by the ring and ball test used to determine the softening point of bitumens. This is described in Chapter 13 page 12 of "Petroleum Products Handbook" edited by Guthrie and published 1960 by McGraw Hill.

TABLE 1

BROAD CHEMICAL COMPOSITION OF BLOWN BITUMEN AND HARDENED EXTRACTS

|  | 115/15 Blown Kuwait Bitumen | 85/25 Straight run Bitumen | HE 100 | HE 120 | HE 150 |
|---|---|---|---|---|---|
| Softening Point Ring and Ball ° C | 115 | 85 | 100 | 120 | 150 |
| Penetration at 25° C mm/10 | 15 | 25 | <1 | <1 | <1 |
| BCC Analysis % |  |  |  |  |  |
| Saturates | 18.1 | 10.0 | 2.0 | 1.6 | 0.8 |
| Cyclics | 33.2 | 55.3 | 46.0 | 41.0 | 34.0 |
| Asphaltenes | 32.5 | 7.1 | 25.0 | 28.0 | 20.0 |
| Resins | 14.9 | 26.1 | 17.0 | 16.0 | 13.0 |
| Toluene Insolubles | 2.1 | 1.5 | 11.0 | 17.0 | 34.0 |

The Vulcanisation System

Chlorosulphonated polyethylene elastomers are cured primarily by the reaction of the —SO$_2$Cl groups with polybasic metal oxides. However sulphur bearing accelerators provide an additional cross linking system through reaction with unsaturation which results from dehydrochlorination during the vulcanisation process. Examples of curing agents which may be used are lead monoxide or monoxide/magnesia, magnesia/pentaerythritol. The vulcanisation agent may contain accelerators e.g. 2,2-benzothiozoyl disulphide, dipentamethylene thiuram tetrasulphide and tetramethyl thiuram monosulphide as accelerator. Curing involves the hydrolysis of the sulphonyl chloride group to the corresponding sulphonic acid which then reacts with the metal oxide. A small amount of water is therefore required for vulcanisation. This vulcanisation step will take place slowly at room temperature if moisture and a suitable metal oxide are present.

Vulcanisation may be carried out in a short period of time at elevated temperature. However the product has good properties without vulcanisation so that articles made from the product such as waterproofing membranes for roofs or reservoirs may be put into use containing a vulcanisation agent but in an unvulcanised state and allowed to vulcanise while in service. It is not even essential to have vulcanisation agents at all.

Optional Additional Ingredients

In addition to chlorosulphonated polyethylene and hardened extract the compositions may also contain major proportions of chlorinated polyethylene and minor proportions of thermoplastics such as PVC, copolymers such as PVC/vinyl acetate, PVC/ethylene, EVA, and high styrene/butadiene; and rubbers such as nitrile rubber (butadiene acrylonitrile copolymer), polychloroprene, and EPDM (ethylene propylene dienemonomer).

Chlorinated polyethylenes with chlorine contents of from 20 to 48% by weight may be used. It is preferred to use chlorinated polyethylenes based on high density polyethylene having chlorine contents of from 25 to 40% by weight chlorine. Particularly preferred are chlorinated polyethylenes CPE 2552 and CPE 3614 which contain 25% and 36% by weight chlorine respectively and which are manufactured by Dow Chemical Company.

The compositions of the present invention may also contain particulate fillers that are commonly used in reinforcing rubber e.g. calcium carbonate, carbon black, titanium dioxide, clay etc. The use of these fillers can improve the tear strength of the blend. Fibrous fillers such as asbestos, cotton, polyester fibres, rayon fibres etc., may also be used.

The compositions of the present invention may also contain certain plasticizers providing these are compatible with the composition i.e. do not readily separate from the composition after being mixed with it. Examples of such plasticizers are aromatic extracts (this being the material from which hardened extract is prepared), chlorinated paraffins for example those having from 12 to 30 carbon atoms in the molecule, and esters for example di-2-ethylhexyl phthalate. Plasticizers for use in chlorosulphonated rubbers are well known to those skilled in the art.

Compositions containing the above mentioned optional additional ingredients may be used in either unvulcanised or vulcanised form.

Relative Quantities of Ingredients

The relative weights of chlorosulphonated polyethylene and hardened extract used in the compositions of the present invention may vary over a wide range but are preferably 4:1 to 1:10, more preferably 2:1 to 1:5, for example 1:1.

Where chlorinated polyethylene is present the weight of chlorinated polyethylene relative to chlorosulphonated polyethylene is preferably in the range 1:9 to 4:1, more preferably 1:4 to 2:1, for example 1:1.

The quantity of particulate filler, if present is preferably in the range 1 to 250, more preferably 10 to 150 parts per hundred parts of chlorine-containing polyethylene elastomer, i.e. chlorosulphonated polyethylene (and chlorinated polyethylene if present), all parts being by weight.

The quantity of plasticiser, if present, is preferably in the range 1 to 50, more preferably 5 to 25 parts by weight per hundred parts by weight of chlorine-containing polyethylene elastomer, i.e. chlorosulphonated polyethylene (and chlorinated polyethylene if present).

The quantity of fibrous filler, if present is preferably in the range 1 to 50, more preferably 5 to 25 parts by weight per hundred parts by weight chlorosulphonated polyethylene and chlorinated polyethylene.

The quantity of vulcanisation agent, if used, will be selected so as to give the desired degree of vulcanisation and the optimum amounts can be readily determined by those skilled in the art.

Preparation of the Compositions

The compositions of the present invention may be prepared by any convenient method. Thus any of the methods used in compounding rubbers may be used, e.g. the methods using a Banbury mixer, or a 2 roll mill.

Uses of Compositions According to the Present Invention

Compositions according to the present invention are particularly useful when formed into sheets for lining reservoirs or for waterproofing roofs. Such sheets may for example be formed by moulding or by calendering between heated rollers. Articles, such as sheets, may be made from compositions according to the present invention which either contain or do not contain a vulcanisation system. If the article is made from a composition which contains a vulcanisation system it may be produced in a vulcanised form, or alternatively produced in an unvulcanised form and allowed to cure in use, as explained in the discussion of the vulcanisation system. The advantages of the procedure are that, unvulcanised sheeting may be joined by heat welding or solvent welding, and the expense of vulcanising at elevated temperatures is avoided.

The invention will now be illustrated by the following examples in which all parts are parts by weight.

The meaning of the various trade names and abbreviations used in these examples in as follows:

| Term | Meaning |
| --- | --- |
| Hypalon 45 | A chlorsulphonated polyethylene containing 25% Cl and 1.0% of S produced by E.I. du Pont de Nemours. |
| HE 150 | A Hardened Extract having a softening point of 150° C. |
| HE 120 | A Hardened Extract having a softening point of 120° C. |
| HE 100 | A Hardened Extract with a softening point of 100° C. |
| 115/15 Bitumen | A bitumen having a softening point of 115° C and a penetration of 15. |
| PEG 4000 | Polyethylene glycol of molecular weight 4000 used as an antitack agent. |
| SRF Black | Semi reinforcing furnace carbon black. |
| Thiuram M | Tetramethyl thiuram monosulphide (a vulcanisation accelerator). |
| CPE 3614 | A chlorinated polyethylene containing 36% Cl produced by Dow. |
| MBTS | Dibenzthiazyl disulphide |
| Robac Thiuram P.25 | Dipentamethylene thiuram tetrasulphide supplied by Robinson Brothers Ltd. |
| MT Black | Medium thermal carbon black. |

EXAMPLES 1–5 AND 7–10

A composition was prepared by mixing chlorosulphonated polyethylene and hardened extract together with other ingredients in a Brabender rubber mixing head at 110°–130° C for 15 minutes. The resulting mixture was then milled on a cold mill for 5 minutes. 1 mm thick sheets from which samples for testing physical properties were cut were prepared by moulding the compositions for 5 minutes at 150° C and then cooling the sheets in the mould.

The ingredients used and the results obtained are shown in Table 2.

EXAMPLE 6

This was carried out in the same way as for Examples 1 to 5 except that the 1 mm sheet, from which the test pieces were cut, was moulded at 153° C for 30 minutes. Table 2 shows the ingredients used and the test results.

Test A

This is a comparative test not according to the invention. A composition was made and test pieces prepared as in Example 1 except that the hardened extract was replaced by bitumen.

Tests B and C

These are comparative tests not according to the invention. Compositions were prepared and tested as in Example 1. The compositions contained chlorinated polyethylene and bitumen and hardened extract respectively, but no chlorosulphonated polyethylene.

Tests D, E and F

These are comparative tests not according to the invention, in which compositions were prepared as in Example 1 but without any hardened extract or bitumen.

Table 2 shows the ingredients used in the comparative tests and the results obtained.

EXAMPLE 11

A portion of the 1 mm thick sheet prepared in Example 4 was immersed in water at 80° C for 1 week and the physical properties measured. Table 3 shows the results.

EXAMPLES 12 to 15

Experiments as described in Example 11 were carried out on portions of the 1 mm sheets prepared in Examples 5, 1, 9 and 10 respectively. Table 3 shows the results.

TABLE 2

| Ex. No. | Hypalon 45 Parts | Extender Parts | Other Reagents Parts | | Shore A Hardness | Tensile Strength MN/m² at 23° C | M300 MN/m at 23° C | Elongation at break % at 23° C | Tear Strength N/mm at 23° C | Brittle Temp (b)° C | Tensile Strength at Break at 50° C MN/m² | Tensile (a) Modulus at 1000% extension at 50° C MN/m² |
| --- | --- | --- | --- | --- | --- | --- | --- | --- | --- | --- | --- | --- |
| 1 | 100 | HE150 100 | PEG 4000 MgO | 1.5 4.0 | 66 | 11.5 | 7.0 | 500 | 62 | −40 | — | 3.0 |
| 2 | 100 | HE150 125 | PEG 4000 | 1.5 | 64 | 10.7 | 8.3 | 510 | 67 | −25 | 4.7 | — |

TABLE 2-continued

| Ex. No. | Hypalon 45 Parts | Extender Parts | Other Reagents Parts | | Shore A Hardness | Tensile Strength MN/m² at 23° C | M300 MN/m at 23° C | Elongation at break % at 23° C | Tear Strength N/mm at 23° C | Brittle Temp (b)° C | Tensile Strength at Break at 50° C MN/m² | Tensile (a) Modulus at 1000% extension at 50° C MN/m² |
|---|---|---|---|---|---|---|---|---|---|---|---|---|
| 3 | 100 | HE150 150 | MgO<br>PEG 4000 | 4.0<br>1.5 | 65 | 10.7 | 6.4 | 430 | 69 | −20 | — | 3.0 |
| 4 | 100 | HE120 100 | MgO<br>PEG 4000 | 4.0<br>1.5 | 59 | 17.6 | 5.0 | 670 | 66 | −50 | — | 2.5 |
| 5 | 100 | HE100 100 | PEG 4000 | 1.5 | 57 | 21.0 | 4.3 | 750 | 64 | −50 | — | 1.5 |
| 6 | 100 | HE100 100 | SRF Black<br>PbO<br>Thiuram M<br>Sulphur | 25<br>28<br>2.0<br>1.0 | 65 | 21.8 | 9.2 | 520 | 71 | −20 | — | — |
| 7 | 100 | HE120 100 | Ti O₂ | 25 | 65 | 12.0 | 4.8 | 750 | 72 | −45 | — | — |
| 8 | 50 | HE120 100 | CPE 3614 | 50 | 64 | 13.2 | 5.5 | 700 | 78 | −40 | — | 1.7 |
| 9 | 100 | HE150 100 | PbO<br>PEG 4000 | 20<br>1.5 | 66 | 12.9 | 10.5 | 460 | 64 | −50 | 3.7 | — |
| 10 | 50 | HE120 100 | CPE 3614<br>PbO<br>MBTS<br>Robac Thiuram P.25 | 50<br>5<br>0.25<br>0.5 | 65 | 14.5 | 6.4 | 700 | 53 | −25 | — | 1.7 |
| A | 100 | 115/15 100 Bitumen | PEG 4000<br>MgO | 1.5<br>4.0 | 52 | 3.1 | 0.4 | 900 | 40 | −30 | — | — |
| B | — | 115/15 100 Bitumen | CPE 3614 | 100 | 45 | 6.5 | 1.1 | 820 | 19 | −30 | — | 0.3 |
| C | — | HE150 100 | CPE 3614 | 100 | 70 | 9.0 | 4.8 | 620 | 51 | −25 | — | 0.6 |
| D | 100 | — | PEG 4000<br>MT Black<br>MgO | 1.5<br>100<br>4.0 | 80 | 10.2 | — | 200 | 67 | −60 | 1.4 | — |
| E | 100 | — | PEG 4000<br>MgO<br>MT Black<br>Enerflex 96 | 1.5<br>4.0<br>100<br>20 | 69 | 8.6 | — | 300 | 57 | −70 | — | — |
| F | 100 | — | — | | 65 | 21.2 | 2.0 | 1200 | 41 | −70 | — | — |

Note:
Brittle temperature is the temperature at which a 1 mm thick sheet snaps when bent through 180° round a ⅛"mandrel.
(a) No break at 50° C for these samples, extensions up to 1000%.

TABLE 3
WATER CURING OF HYPALON MEMBRANES

| Example No. | Extender Parts | MgO Parts | Other Reagents Parts | Shore A Hardness Moulded | Tensile Strength MN/m² (b) Moulded | Tensile Strength MN/m² (c) Water Cured | Elongation Break % Moulded | Elongation Break % Water Cured | Tear Strength N/mm Moulded | Tear Strength N/mm Water Cured | Tensile Properties at 50° C MN/m² (d) Moulded | Tensile Properties at 50° C MN/m² (d) Water Cured | Brittle Temp. °C Moulded | Brittle Temp. °C Water Cured | Water (c) Absorbed % |
|---|---|---|---|---|---|---|---|---|---|---|---|---|---|---|---|
| 4 | HE 120 100 | — | — | 59 | 17.6 | 17.7 | 670 | 570 | 66 | 55 | 2.5 M | 2.7 M | −50 | −50 | 17 |
| 5 | HE 100 100 | — | — | 57 | 21.0 | 18.1 | 750 | 560 | 64 | 55 | 1.5 M | 2.7 M | −50 | −50 | 22 |
| 1 | HE 150 100 | 4.0 | — | 66 | 11.5 | 7.9 | 500 | 400 | 62 | 57 | 3.0 M | 3.0 S | −40 | −20 | 28 |
| 9 | HE 150 100 | — | PbO 20<br>CPE 3614 50<br>PbO 5<br>MBTS 0.25 | 66 | 12.9 | 11.7 | 460 | 460 | 64 | 85 | 3.7 S | 4.6 M | −50 | −20 | 12.6 |
| 10 | HE 120 100 | — | Robac 0.5<br>Thiuram P.25 | 65 | 14.5 | 13.6 | 700 | 500 | 53 | 50 | 1.7 M | 4.7 M | −25 | −25 | 9.1 |

(a) All compositions contained 100 parts Hypalon 45 and 1.5 parts polyethylene glycol 4000.
(b) Specimens were moulded for 5 mins at 150° C.
(c) Sheets were water cured by immersing in water at 80° C for 1 week.
(d) M is tensile modulus at 1000% extension (no break) S is tensile strength at break.

If we consider comparative Test F we find from Table 2 that chlorosulphonated polyethylene without any additives has a very high elongation at break and a low modulus (M300) and tear strength. Sheets made from this material would not be satisfactory for use as waterproofing membranes, because they would be liable to overstretching and puncture during installation. If chlorosulphonated polyethylene is mixed with carbon black, which is often added to rubbers as a filler, as in Test D, there is a large reduction in tensile strength and an excessive reduction in elongation at break and an excessive increase in hardness. Furthermore the tensile properties of the composition at +50° C are poor.

Test E shows that the addition of an aromatic extract liquid extender to the composition filled with carbon black causes a further reduction in hardness, tensile strength and tear strength and a slight increase in elongation at break.

Test A shows in Table 2 that a mixture of chlorosulphonated polyethylene and bitumen has a very low tensile strength, modulus and tear strength and a relatively high brittle temperature. Such a material would be most unsatisfactory for use in preparing waterproof membranes. A comparison of the results shown in Table 2 for Example 1 and Test A shows that when the bitumen is replaced by the same quantity of hardened extract, the tensile strength and modulus are several times higher, the elongation at break is several times less and the brittle temperature is lower, and the tear strength is considerably improved. A comparison between Example 1 and Test F shows that the addition of hardened extract although causing a reduction in tensile strength compensates for this by giving a highly desirable increase in modulus and tear strength.

The importance of using chlorosulphonated polyethylene and not merely chlorinated polyethylene can be seen from a comparison of the results given in Table 2 for Test C and Example 1 where the replacement of chlorosulphonated polyethylene by chlorinated polyethylene gave a product with a lower tensile strength at 23° C, lower modulus, and reduced tear strength, and a Tensile Modulus at 1000% extension at 50° C which was many times smaller than that obtained using chlorosulphonated polyethylene mixed with the same quantity of hardened extract.

Example 8 shows that when a 1:1 blend of Hypalon and chlorinated polyethylene is extended with an equal weight of hardened extract, tensile and tear strengths are nearly as good as when Hypalon itself is extended with hardened extract.

Example 10 shows that addition of minor amounts of curing agents such as PbO, MBTS, and Robac Thiuram P.25 to a composition as described in Example 8 results in a composition which cures in the presence of water to give improved tensile properties at +50° C.

I claim:

1. A blend of chlorosulphonated polyethylene elastomer and hardened extract, said hardened extract being obtained by blowing a gas containing free oxygen at elevated temperatures into a solvent extract of a distillate petroleum fraction or a deasphalted petroleum residue, said hardened extract having a boiling point above 350° C at atmospheric pressure, containing a major proportion of aromatic hydrocarbons and having a saturated hydrocarbon content of not more than 10% by weight, the weight ratio of said chlorosulfonated polyethylene to hardened extract being in the range of from about 4:1 to 1:10.

2. A blend according to claim 1 wherein the hardened extract has a content of asphaltenes and toluene insolubles of at least 20% by weight.

3. A blend according to claim 2 wherein the hardened extract has a content of "saturates" of less than 5% by weight.

4. A blend according to claim 3 wherein th hardened extract has a content of asphaltenes which is at least 20% by weight.

5. A blend according to claim 1 wherein the hardened extract has a softening point in the range 50° to 200° C.

6. A blend according to claim 5 wherein the hardened extract has a softening point in the range 85° to 170° C.

7. A blend according to claim 1 wherein the blend contains a vulcanising agent.

8. A blend according to claim 7 wherein the vulcanising agent is polybasic metal oxide.

9. A blend according to claim 8 wherein the vulcanising agent comprises lead monoxide.

10. A blend according to claim 1 which contains a major proportion of chlorinated polyethylene.

11. A blend according to claim 10 wherein the chlorinated polyethylene is based on high density polyethylene and has a chlorine content of from 25% to 40% by weight of chlorine.

12. A blend according to claim 1 wherein the weight ratio is in the range 2:1 to 1:5.

13. A blend according to claim 10 wherein chlorinated polyethylene is present in a weight ratio of chlorinated polyethylene to chlorosulphonated polyethylene in the range 1:9 to 4:1.

14. A blend according to claim 13 wherein the weight ratio of chlorinated polyethylene to chlorosulphonated polyethylene is 1:4 to 2:1.

15. A blend according to claim 5 which comprises from 1 to 250 % by weight of particulate filler based on the weight of chlorine-containing polyethylene elastomer.

16. A blend according to claim 15 which comprises from 10 to 150% by weight of particulate filler based on the weight of chlorine-containing polyethylene elastomer.

17. A blend according to claim 5 which comprises from 1 to 50% by weight of plasticiser based on the weight of chlorine-containing polyethylene elastomer.

18. A blend according to claim 5 which comprises from 1 to 50% by weight of fibrous filler based on the weight of chlorine-containing polyethylene elastomer by weight.

* * * * *